Patented Apr. 26, 1938

2,115,054

UNITED STATES PATENT OFFICE 2,115,054

COMPOSITIONS OF PHOSPHATES AND HALOGEN CONTAINING RUBBER DERIVATIVES

Herbert A. Winkelmann, Chicago, Ill., assignor to Marbon Corporation, Chicago, Ill., a corporation of Delaware No Drawing. Application September 26, 1935, Serial No. 42,280

8 Claims. (Cl. 106—23)

This invention relates to compositions of salts of phosphorous acids and halogen containing rubber derivatives. More particularly it relates to compositions of basic phosphates and rubber hydrohalides, and to products obtained therefrom.

It is an object of this invention to obtain homogeneous, strong, solid rubber hydrochloride compositions without the use of solvents, and their subsequent evaporation.

A further object is to produce halogen containing thermoplastic compositions which are hard, strong, and relatively inextensible.

Another object of this invention is to produce rubber hydrochloride compositions which are relatively stable to heat.

Another object is to produce transparent, thermoplastic thick masses.

Other objects will become apparent on reading the specification.

In the present invention a halogen containing rubber derivative is mixed with a phosphorus compound such as a phosphate. The products obtained vary according to the kind of halogen containing rubber derivative, the kind and amount of phosphorus compound, and the treatment accorded this composition.

The preferred halogen containing rubber derivatives are the rubber hydrohalides, particularly the rubber hydrochlorides. Such products combine with the basic phosphates to give compositions superior in strength, clarity and stability to the compositions containing the halogenated rubbers, or the halogenated rubber hydrohalides. Various types of rubber hydrochlorides may be used ranging through the soluble type rubber hydrochloride such as is made with liquefied hydrogen chloride and rubber at around —85° C., and the relatively insoluble type rubber hydrochloride made with gaseous hydrogen chloride and solid rubber at above room temperatures. The rubber hydrohalides and rubber halides may be partially or completely reacted.

The preferred phosphorus compounds from the point of view of giving clear, transparent, strong solid masses when combined with rubber hydrohalides are the alkali metal and ammonium phosphates. Clear, relatively transparent sheets of ⅛" thickness are obtained on molding a mixture of 10 parts of these phosphates and 100 parts of rubber hydrochloride, by weight, for 3 minutes at 230° F. However, some of the alkali metal phosphates, as viz. sodium acid pyrophosphate and sodium meta phosphates are not good heat stabilizers and where much higher temperatures than 230° F. are used as for example 60 minutes at 200° F. it is advisable in order to retain transparency and strength, to add a heat stabilizer such as magnesium oxide. However, disodium phosphate is a heat stabilizer of only slightly less strength than magnesium oxide and other stabilizers such as described and claimed in my copending application S. N. 11,665, filed March 18, 1935, also may be used. Trisodium phosphate and tetra sodium phosphate are stabilizers of fair order in that in 10 parts per 100 of rubber hydrochloride they will substantially prevent gassing on milling and will combine with rubber hydrochloride on molding at 3 minutes at 230° F. to give products of good strength and in the case, particularly of sodium tetra phosphate, products of superior transparency and clarity. Other alkali metal and ammonium phosphates behave similarly. The glycero phosphates give strong composition of good transparency, the sodium glycero phosphate composition being exceeded, if at all, only by the sodium tetra phosphate composition. Other phosphates than the alkali metal phosphates give compositions of good transparency and stability. Amylamine phosphate combines with rubber hydrochloride on milling and cold molding to give a clear nearly transparent product in sheets of ⅛" thickness. This compound also acts as a plasticizer and a heat stabilizer of fair degree.

Although it is not essential that a phosphorus compound be a heat stabilizer in order for it to combine with rubber hydrochloride and give light colored masses, it is an important property.

The following materials when used in 10 parts by weight per 100 parts of rubber hydrochloride prevent or nearly prevent the evolution of gas during milling on a regulation rubber mill for fifteen minutes or longer; disodium phosphate, trisodium phosphate, tetra sodium pyrophosphate, strontium phosphate, lead phosphate, amylamine phosphate, aniline phosphate, dibasic ammonium phosphate, nickel phosphate and sodium, potassium and ammonium hypophosphites. On the other hand the following materials are not so satisfactory as stabilizers, although useful for other properties: zinc phosphate, tribasic calcium phosphate, dibasic magnesium phosphate, barium phosphate, cadmium phosphate, monobasic ammonium phosphate, copper phosphate, ferric phosphate, monobasic calcium phosphate, dibasic calcium phosphate, sodium meta phosphate, monobasic sodium phosphate.

For molding and curing purposes, all the phosphate salts and particularly those which are good stabilizers during milling are suitable. However, ferric phosphate does not prevent sweating during even a three minute molding at 230° F., and monobasic calcium phosphate is also bad. Heat treatment as by molding at 260° F., for thirty minutes results in sweating and blowing for many of the phosphate compositions. The phosphates which give the best results from the point of view of retarding sweating and blowing are trisodium phosphate, disodium phosphate and dibasic ammonium phosphate.

The following materials are arranged in order of their ability to give a stiff composition, the best materials being first. The compositions all contain 10 parts variable to 100 parts rubber hydrochloride, and are molded 3 minutes at 230° F., and 30 minutes at 260° F.

Stiffness

| 3 minutes molded at 230° F. | 30 minutes molded at 260° F. |
|---|---|
| Disodium phosphate | Disodium phosphate |
| Trisodium phosphate | Trisodium phosphate |
| Tribasic calcium phosphate | Ferric phosphate |
| Dibasic magnesium phosphate | Monobasic sodium phosphate |
| Barium phosphate | Cadmium phosphate |
| Dibasic ammonium phosphate | Copper phosphate |
| Monobasic ammonium phosphate | Monobasic calcium phosphate |
| Dibasic calcium phosphate | Sodium meta phosphate |
| Monobasic sodium phosphate | Nickel phosphate |
| Ferric phosphate | Dibasic magnesium phosphate |
| Cadmium phosphate | Dibasic calcium phosphate |
| Monobasic calcium phosphate | Monobasic ammonium phosphate |
| Nickel phosphate | Barium phosphate |
| Aniline phosphate | Amylamine phosphate |
| Copper phosphate | Aniline phosphate |
| Calcium phosphide | Tribasic calcium phosphate |
| Amylamine phosphate | Dibasic ammonium phosphate |
| Sodium meta phosphate | Calcium phosphide |

The following materials are arranged in order of their ability to give light colored compositions by reflected light, the best materials being at the head of the list:

| 3 minutes molded at 230° F. | 30 minutes molded at 260° F. |
|---|---|
| Dibasic ammonium phosphate | Calcium phosphide |
| Barium phosphate | Monobasic calcium phosphate |
| Monobasic ammonium phosphate | Dibasic ammonium phosphate |
| Cadmium phosphate | Cadmium phosphate |
| Monobasic calcium phosphate | Barium phosphate |
| Aniline phosphate | Sodium meta phosphate |
| Nickel phosphate | Amylamine phosphate |
| Copper phosphate | Dibasic magnesium phosphate |
| Calcium phosphide | Monobasic ammonium phosphate |
| Amylamine phosphate | Dibasic calcium phosphate |
| Sodium meta phosphate | Monobasic sodium phosphate |
| Tribasic calcium phosphate | Aniline phosphate |
| Dibasic magnesium phosphate | Nickel phosphate |
| Dibasic calcium phosphate | Tribasic calcium phosphate |
| Ferric phosphate | Copper phosphate |
| Monobasic sodium phosphate | Ferric phosphate |

An important object of this invention is to obtain molded products of high tensile strength. The product obtained by molding the composition containing disodium phosphate at 230° F. for 3 minutes has a tensile strength of approximately 6300 pounds per square inch, an elongation of 10 and a Pusey & Jones penetrometer reading of 14. Continued heat treatment at 260° F. for one hour only reduces the tensile strength to about 5200 pounds per square inch. The elongation remains at 10 and the hardness increases slightly to 10. This is evidence of particularly good stabilizing action of the disodium phosphate. Lowering the amount of disodium phosphate below 10 parts has little effect until about 5 parts is reached below which the stabilizing action of the disodium phosphate lessens and the tensile falls on heat treated products. Increasing the amount of disodium phosphate beyond 20 parts causes a gradual lowering of the tensile due to the filling action of the disodium phosphate. The trisodium phosphate gives similar results to the disodium phosphate although its tensile strength is not quite as high.

Some of the metallic phosphates have the property of giving compositions with rubber hydrochloride which become harder on heat treatment. Cadmium phosphate, although showing no evidence of preventing gassing during milling, when used in 10 parts by weight shows a tensile strength of approximately 4500 pounds, elongation 30 and hardness of .12 millimeter when molded at 230° F. for 3 minutes; and a tensile of 5,400 pounds, elongation 10 and hardness of 4 when molded at 260° F. for thirty minutes. The tensile thus remains about the same or slightly increases, the brittleness increases and the hardness increases.

The following table shows the physical characteristics on several phosphate salts which increase in hardness. The formula is 100 parts rubber hydrochloride, 10 parts phosphate by weight. The elongation is expressed in percent, and the hardness in terms of 1/100 millimeter penetration by the Pusey & Jones penetrometer.

| Phosphate | Gassing | Molded at 230° F. 3 minutes | | | Molded 260° F. 30 minutes | | |
|---|---|---|---|---|---|---|---|
| | | Tens. | Elong. | Hard. | Tens. | Elong. | Hard |
| Cadmium | Much | 4,500 | 30 | 12 | 5,400 | 10 | 4 |
| Copper | Some | 4,300 | 40 | 8 | 5,300 | 10 | 4 |
| Monobasic amm | Some | 5,200 | 10 | 14 | 4,100 | 10 | 7 |
| Nickel | Little | 4,170 | 50 | 12 | 5,100 | 10 | 4 |

The following table gives the physical characteristic of some phosphates which when used with rubber hydrochloride give compositions which decrease in hardness on heat treatment.

| Phosphate | Gassing on mill | Molded 230° F. 3 min. | | | Molded 260° F. 30 min. | | |
|---|---|---|---|---|---|---|---|
| | | Tens. | Elong. | Hard. | Tens. | Elong. | Hard. |
| Amylamine | Start only | 4,540 | 27 | 6 | 2,300 | 73 | 19 |
| Aniline | Start only | 5,100 | 10 | 5 | 3,000 | 160 | 13 |
| Tribasic calcium | Some | 4,500 | 30 | 12 | 2,500 | 490 | 17 |
| Dibasic calcium | Some | 5,000 | 10 | 6 | 4,100 | 27 | 14 |
| Sodium meta phosphate | Much | 1,900 | 460 | 5 | 4,200 | 10 | 11 |
| Calcium phosphate | | 3,700 | 13 | 10 | 1,900 | 253 | 44 |

The zinc phosphate acts similar to zinc oxide on rubber hydrohalides in that it causes much gassing on the mill, and on exposure of the zinc phosphate-rubber hydrochloride composition to heat there results a composition which is weak and brittle although still having a total chlorine content of around 25%. The iron phosphate acts similar to the zinc phosphate, although evidently not so vigorously. With 10 parts of ferric phosphate there is much gas on milling. The milled product on molding for 3 minutes at 230° F. is black and opaque, has a tensile of 2900 pounds, elongation of 10 and hardness of 8. Further heat treatment at 260° F. for thirty minutes gives a composition which is brittle and stiff having a tensile of 1700 pounds, elongation of 10 and hardness of 7.

It is to be understood that the proportions of phosphates and halogen containing rubber derivatives may vary widely. In general the amount of phosphates other than zinc phosphate should be between about 5 parts to 30 parts by weight per 100 parts of rubber hydrochloride to obtain products of high tensile strength and good heat stability. The upper limit, of course, may be much higher than 30 parts where tensile strength is not an important factor. The lower limit may also be varied according to the kind of phosphate and the result desired. The use of heat stabilizers in general is disclosed and claimed in my copending application, Serial No. 11,665, filed March 18, 1935. Such materials, particularly magnesium oxide, may be used in conjunction with any of the phosphates. However, the disodium phosphates are similar to magnesium oxide in stabilizing ability and some of the other basic phosphates, as for example trisodium phosphate, dibasic ammonium phosphate, amylamine phosphate, aniline phosphate and nickel phosphate are also heat stabilizers of good order. The minimum amount of basic phosphate which will retard heat disintegration varies according to the kind of phosphate. The disodium phosphate has an appreciable effect even when 5 parts are milled with 100 parts of rubber hydrochloride. In general the amount should be above 5 parts for the phosphates and should be as high as possible consistent with good tensile strength, and if desired consistent with transparency. The preferred stabilizers are those materials noted above which give heat stabilization on 10 parts or lower. In addition to the stabilizing effect of some of the phosphates, the phosphates in general have the advantage over the oxides and carbonates in that the reaction product of the phosphates and hydrogen chloride is relatively non-volatile. Furthermore, several of the phosphates as viz., sodium meta phosphate, although of little or no apparent use as heat stabilizers, impart stiffness to the compositions and in combination with rubber hydrochloride have a light color. The other phosphates, including the zinc phosphates are of value in a rubber hydrochloride composition, and the invention is therefore not limited to phosphates having a stabilizing action, although such may also be specifically claimed as an important part of this invention. In general, for ordinary milling and molding the chlorine content of the composition containing originally 25% and more chlorine will average over 20% chlorine. It is the physical characteristics which show the greatest difference with different phosphates, and this invention particularly points out the effect of various phosphates in rubber hydrochloride compositions.

I claim:

1. A composition of matter comprising a rubber hydrochloride and an alkali metal phosphate.
2. A composition of matter comprising a rubber hydrochloride and a sodium phosphate.
3. A composition of matter comprising a rubber hydrochloride and disodium phosphate.
4. A composition of matter comprising a rubber hydrochloride and trisodium phosphate.
5. A composition of matter comprising a rubber hydrochloride and a sodium glycero-phosphate.
6. A composition capable of being exposed to normal hot molding conditions without substantial decomposition comprising a rubber hydrochloride intimately admixed with a basic phosphate as a stabilizer therefor.
7. A composition capable of being exposed to normal hot molding conditions without substantial decomposition comprising as an essential ingredient a rubber hydrochloride intimately admixed with a basic alkali metal phosphate as a stabilizer therefor.
8. A composition comprising essentially a rubber hydrochloride and from about 5 parts to 30 parts by weight of an alkali metal phosphate per 100 parts by weight of said rubber hydrochloride.

HERBERT A. WINKELMANN.